United States Patent
Doner et al.

[11] Patent Number: 6,114,823
[45] Date of Patent: *Sep. 5, 2000

[54] CIRCUIT AND APPARATUS FOR SENSING FLUID FLOW

[75] Inventors: Thomas O. Doner, Cary, Ill.; George J. McHugh, West Chester, Pa.

[73] Assignee: AGF Manufacturing, Inc., West Chester, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/001,216

[22] Filed: Dec. 30, 1997

[51] Int. Cl.$^7$ .................................................. H02P 7/00
[52] U.S. Cl. ...................... 318/487; 318/588; 318/647; 73/155
[58] Field of Search .................. 318/282, 601, 318/588, 647, 638, 460–487; 4/408, 250; 310/37, 36, 39; 364/167.01, 183; 251/129.01, 129.05; 324/207; 73/155, 861.75, 861.71; 137/486, 495, 624.12, 487.5, 460; 431/76

[56] References Cited

U.S. PATENT DOCUMENTS

| | | | |
|---|---|---|---|
| 3,176,284 | 3/1965 | Jones et al. | 340/530 |
| 3,597,632 | 8/1971 | Vandemore et al. | 307/252 |
| 3,623,088 | 11/1971 | Peterson | 340/529 |
| 3,625,289 | 12/1971 | Gloeckler | 169/39 |
| 3,633,676 | 1/1972 | Gloeckler | 169/40 |
| 3,688,130 | 8/1972 | Granieri | 327/449 |
| 3,713,126 | 1/1973 | Stettner | 340/527 |
| 3,715,623 | 2/1973 | Szabo | 327/457 |
| 3,715,700 | 2/1973 | Gloeckler | 337/407 |
| 3,740,585 | 6/1973 | Squiers | 327/456 |
| 3,742,337 | 6/1973 | Digneffe | 327/457 |
| 3,745,382 | 7/1973 | Hoge et al. | 307/293 |
| 3,746,887 | 7/1973 | Lorenz | 327/455 |
| 3,749,864 | 7/1973 | Tice | 200/81.9 M |
| 3,756,321 | 9/1973 | Gloeckler | 169/40 |
| 3,764,832 | 10/1973 | Stettner | 307/293 |
| 3,779,004 | 12/1973 | Gloeckler | 59/93 |
| 3,794,858 | 2/1974 | Squiers | 327/143 |
| 3,846,648 | 11/1974 | Scott | 327/392 |
| 3,857,277 | 12/1974 | Moore | 73/28 |
| 3,874,456 | 4/1975 | Gloeckler | 169/39 |
| 3,906,641 | 9/1975 | Freeman | 33/363 R |
| 3,921,989 | 11/1975 | Ward | 277/173 |
| 3,940,634 | 2/1976 | Grogan | 327/451 |
| 3,946,691 | 3/1976 | Freeman | 318/588 |
| 4,103,294 | 7/1978 | Stettner et al. | 367/136 |
| 4,152,608 | 5/1979 | Nakasone et al. | 327/402 |
| 4,319,236 | 3/1982 | Brace et al. | 340/679 |
| 4,331,914 | 5/1982 | Huber | 327/457 |
| 4,353,390 | 10/1982 | Karpenko | 137/527.8 |
| 4,356,397 | 10/1982 | Lenderking et al. | 250/231 SE |
| 4,382,192 | 5/1983 | Mendelson | 307/141.4 |
| 4,458,239 | 7/1984 | Willey et al. | 340/540 |
| 4,586,893 | 5/1986 | Somerville et al. | 431/76 |
| 4,745,311 | 5/1988 | Iwasaki | 327/428 |
| 4,757,865 | 7/1988 | Simons | 169/39 |

(List continued on next page.)

OTHER PUBLICATIONS

Clare Reed Switches Brochure, pp. 48 and 53.
Potter Electric Signal Company; Thornhill, Ontario, Canada; Switch Brochure, Dec., 1995.

*Primary Examiner*—Paul Ip
*Attorney, Agent, or Firm*—Burns, Doane, Swecker & Mathis, LLP

[57] ABSTRACT

A circuit and apparatus for magnetically sensing fluid flow through a conduit. The circuit includes a sensor and a sensor magnet for biasing the sensor in an on condition. A second magnet indicative of the relative position of a conduit valve substantially neutralizes the sensor magnet when the valve is closed to prevent fluid flow, and does not substantially neutralize the sensor magnet when the valve is open to permit fluid flow. The sensor can be a Hall effect sensor, and the sensing of fluid flow causes an indication current to flow. Circuitry is provided to apply a voltage to a load in response to the indication current.

22 Claims, 2 Drawing Sheets

U.S. PATENT DOCUMENTS

| | | | |
|---|---|---|---|
| 4,791,254 | 12/1988 | Polverari | 200/81.9 M |
| 4,831,350 | 5/1989 | Rose | 335/205 |
| 4,866,426 | 9/1989 | Evans et al. | 340/568 |
| 4,914,566 | 4/1990 | Steutermann | 364/167.01 |
| 4,963,857 | 10/1990 | Sackett | 340/606 |
| 4,977,963 | 12/1990 | Simons | 169/37 |
| 4,987,957 | 1/1991 | Galaszewski | 169/37 |
| 5,036,234 | 7/1991 | Friedrich et al. | 327/457 |
| 5,038,820 | 8/1991 | Ames et al. | 137/486 |
| 5,063,775 | 11/1991 | Walker, Sr. et al. | 73/155 |
| 5,072,792 | 12/1991 | Simons et al. | |
| 5,086,273 | 2/1992 | Leon | 324/207.17 |
| 5,140,263 | 8/1992 | Leon | 324/207.17 |
| 5,195,592 | 3/1993 | Simons | 169/37 |
| 5,198,973 | 3/1993 | Steutermann | 364/167.01 |
| 5,234,059 | 8/1993 | Eynon | 169/39 |
| 5,236,011 | 8/1993 | Casada et al. | 137/554 |
| 5,305,787 | 4/1994 | Thygesen | 137/527 |
| 5,323,062 | 6/1994 | Crawford et al. | 327/455 |
| 5,372,203 | 12/1994 | Galaszewski | 169/37 |
| 5,400,446 | 3/1995 | Bloemer et al. | 4/408 |
| 5,406,979 | 4/1995 | McHugh | 137/557 |
| 5,504,426 | 4/1996 | Ricci et al. | 324/207.17 |
| 5,523,682 | 6/1996 | Leon | 324/207.17 |
| 5,589,769 | 12/1996 | Krahn | 324/207.26 |
| 5,632,339 | 5/1997 | Fenske et al. | 169/37 |
| 5,705,987 | 1/1998 | Doner | 340/606 |
| 5,716,271 | 2/1998 | Paidosh | 454/359 |
| 5,723,918 | 3/1998 | Schilling et al. | 318/282 |

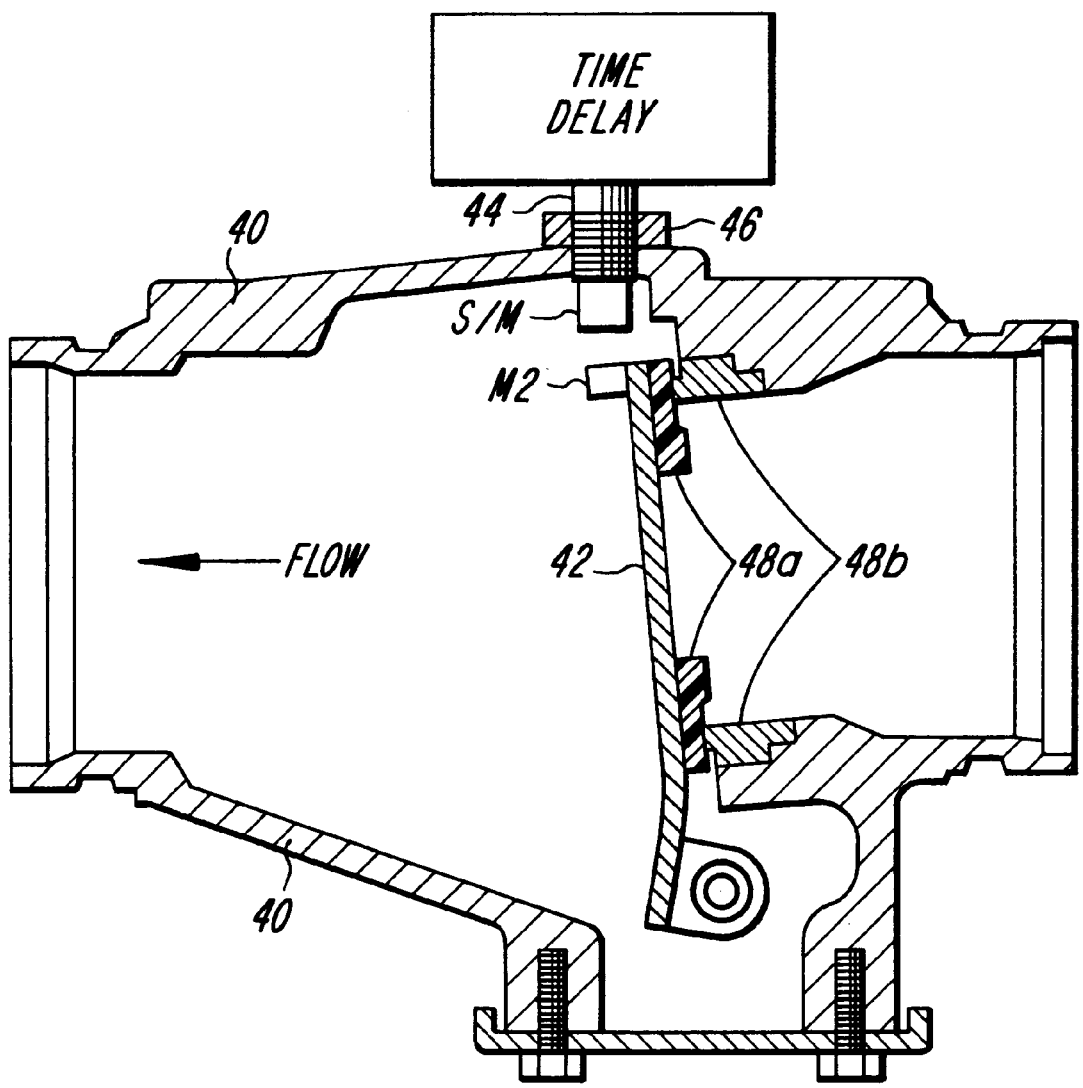

CIRCUIT AND APPARATUS FOR SENSING FLUID FLOW

FIELD OF THE INVENTION

The present invention relates to sensing circuits. More particularly, the present invention relates to a circuit for sensing fluid flow through a conduit.

BACKGROUND OF THE INVENTION

Numerous control circuits have been designed to apply a voltage or current to an electrical load after a time delay. Examples of such circuits are disclosed in U.S. Pat. No. 3,745,382 to Hoge et al., U.S. Pat. No. 3,597,632 to Vandemore, and U.S. Pat. No. 3,764,832 to Stettner. However, these and other known control circuits are relatively complicated and have numerous components, thus increasing manufacturing difficulty and costs. Further, these and other known control circuits typically provide relatively lengthy time delays, on the order of five minutes, and are unreliable.

Control circuits are used in a variety of applications including, for example, to activate an alarm circuit in a fire protection system. Conventional fire protection systems typically include a source of water or other fire-extinguishing fluid, a detector for detecting the flow of the fire extinguishing fluid through a pipe or conduit, and an alarm circuit or other load that is activated when a sufficient flow is detected.

In such systems, the alarm is preferably not activated immediately upon detection of fluid flow in the conduit, because flow may occur due to a "water hammer" or fluid backwash within the system. If the alarm were activated immediately upon detection of a water flow, a large number of false alarms would result.

In order to reduce or eliminate such false alarms, a control circuit can delay the activation of the alarm for a predetermined time following detection of an alarm condition. Early detection and control circuits included simple mechanical devices, such as dashpots in which air was forced into and out of a chamber. The alarm would not sound until the air was completely out of the chamber, at which time a switch would close to activate the alarm.

These and other conventional detection mechanisms were designed to provide a delay in the range of 30 seconds to 90 seconds. However, these devices were unreliable and inaccurate, and were thus unsuccessful in eliminating false alarms. Accordingly, solid state electrical load control circuits were developed for fire protection systems such as the time delay circuit known as ICM/HMKS-W1104. These electrical load control circuits delay activation of the alarm until an electrical sensor or switch is rendered conductive.

It would be desirable to provide a relatively simple, reliable, and easy-to-install sensor circuit with minimal current draw, in order to detect a condition (such as fluid flow) which requires activation of a load such as an alarm. While certain flow sensing devices are known, such as those described in U.S. Pat. No. 3,749,864 to Tice and U.S. Pat. No. 4,791,254 to Polverari, these and other similar devices include relatively complex arrangements of moving parts.

SUMMARY OF THE INVENTION

The present invention solves the foregoing problems, and provides additional advantages, by providing for an apparatus and circuit for magnetically sensing fluid flow through a fluid-carrying conduit. According to presently-preferred embodiments, a valve such as a flapper valve disposed within the conduit is provided with a first magnet. The valve, and hence the magnet, moves to permit fluid flow. A sensor is associated with the valve and senses movement of the first magnet, and hence the valve, such that the sensor generates a first output (e.g., is "off") when the valve is in a first position (e.g., closed), and generates a second output (e.g., an indication signal) when the valve is in a second position (e.g., open). The sensor can be a Hall effect sensor which is provided with a second magnet to bias the Hall effect sensor in an active state, the first magnet substantially neutralizing the second magnet when the valve is in the first position, and not neutralizing the second magnet when the valve is in the second position.

According to one aspect of the present invention, the sensor can be encased in a tube sealed with substantially watertight material and inserted into the conduit (e.g., by threading the encased sensor through a threaded pipe opening) near the valve.

The indicator circuit of the present invention provides simple and reliable sensing of fluid flow by magnetically sensing the state of a valve in a conduit, and advantageously accomplishes these functions using solid-state components. The sensor has minimal current draw and can be easily and reliably mounted in, for example, a fire protection system.

BRIEF DESCRIPTION OF THE DRAWINGS

The features and advantages of the present invention will be more fully understood upon reading the following Detailed Description of the Preferred Embodiments in conjunction with the accompanying drawings, in which like reference indicia indicate like elements, and in which:

FIG. 3 is a cross-sectional diagram showing an exemplary implementation of an apparatus incorporating the present invention.

DETAILED DESCRIPTION OF THE PREFERRED EMBODIMENTS

Figure 1:
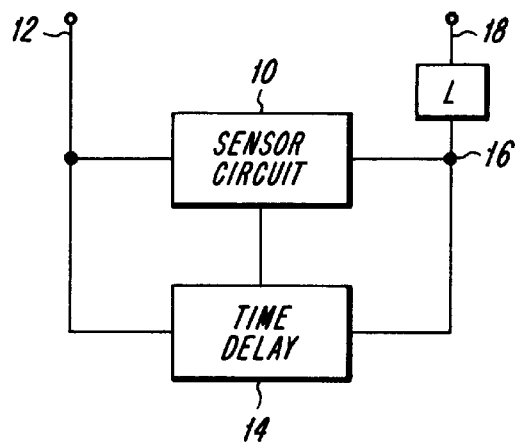
FIG. 1 is a circuit diagram showing an exemplary embodiment of the indicator circuitry of the present invention.

Referring now to FIG. 1, an exemplary embodiment of a sensor circuit according to the present invention is shown. The invention will be described with respect to a fire protection system in which the invention can be used to indicate the flow of water through a pipe, but it will be appreciated that the invention can be implemented in other environments to indicate other types of events.

In the circuit of FIG. 1, a sensor 10 is implemented in a fire protection circuit substantially similar to the circuit shown and described in the copending, commonly-assigned application entitled "Circuit For Controlling Operation of a Load After a Predetermined Time Delay", Ser. No. 08/589,389, now U.S. Pat. No. 5,705,987, filed Jan. 22, 1996, the entirety of which is incorporated by reference in this application. The related application describes a time delay circuit for controlling the activation of a load such as an alarm circuit in a fire protection system. In such a system, the flow of water or other fire suppression fluid through the pipes of a building sprinkler system (to prevent or minimize fire damage) is detected, causing a switch to close and apply an operating voltage to the alarm circuit, after some time delay to guard against false alarms. Because this related application describes the time delay circuit in significant detail, only the portions of the circuit relating to the sensor circuit of the present invention will be described here.

According to the invention, a sensor circuit 10 is connected as shown between a neutral wire 12, an input of a time delay circuit 14 (such as the one shown in the related application described above), and a terminal 16 of a load L (e.g., an alarm, which can be embodied by one or more lights, sirens, motors, solenoids, or other loads) which is connected between a power input terminal 18 and the time delay circuit 14. The power input terminal receives an input voltage of, for example, 12–130 volts A.C. The sensor circuit 10 senses fluid flow through a pipe, and when fluid flow is sensed, the sensor circuit 10 generates an output signal and supplies this signal to the delay circuit 14. The delay circuit 14 then operates to apply the supply voltage across the terminals 12 and 18, thereby applying the supply voltage to the load 16 and activating the alarm. The sensor circuit 10 can be implemented using a Hall effect sensor or other suitable sensor, as will be described in more detail with respect to FIG. 2. It will be appreciated that, as described in the related application referenced above, the delay circuit is useful for preventing false alarms; therefore, it should also be appreciated that the delay circuit can be excluded from the circuit of FIG. 1.

Figure 2:
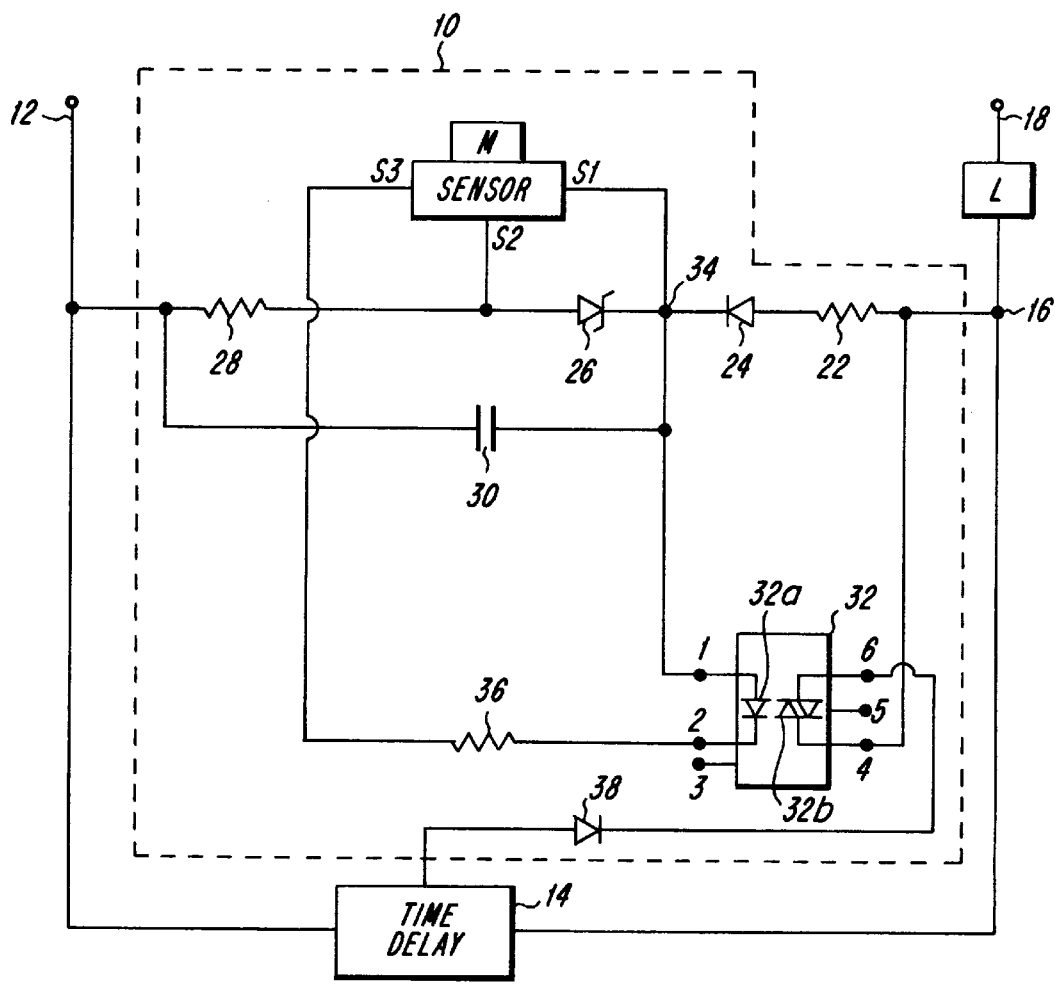
FIG. 2 is a more detailed circuit diagram showing the components of the sensing circuit of FIG. 1.

Referring now to FIG. 2, a more detailed diagram of the circuit of FIG. 1 is shown. As shown, the sensor circuit 10 includes a sensor 20, which can be a Hall effect switch having three terminals S1 (a positive voltage input terminal), S2 (a negative voltage input terminal), and S3 (an output terminal). As is well known in the art, a Hall effect switch provides an output based on magnetic flux. The circuit also includes a first current-limiting resistance 22, a diode 24, a zener diode 26, and a second current-limiting resistance 28. These elements 22, 24, 26, and 28 are connected in series between node 16 and the neutral wire 12. The sensor circuit of FIG. 2 also includes a storage capacitor 30 connected in parallel with the series-connected zener diode 26 and second current-limiting resistor 28. The circuit also includes an opto-triac 32 having connection pins 1–6. In this embodiment, connection pin 1 is connected to node 34, connection pin 2 is connected to the sensor 20 via a third current-limiting resistance 36, connection pin 3 is left open, connection pin 4 is connected to node 16, connection pin 5 is open, and connection pin 6 is connected to the time delay circuit via a rectifying diode 38.

In an initial state, a power supply connected across lines 12 and 18, provides a voltage at node 16, which charges storage capacitor 30 via current-limiting resistance 22 and diode 24. Assuming that the power supply provides 120 volts A.C., the storage capacitor 30 will be charged to approximately 140–150 volts, which is typically too high for a sensor such as a Hall effect sensor. Accordingly, zener diode 26 and resistor 28 provide a voltage regulation function such that the voltage across sensor terminals S1 (node 34) and S2 is a filtered 24 volts. The sensor 20, normally non-conductive or "off", is biased to a normally conductive state by a magnet M. This sensor is located in relatively close proximity to a valve (not shown) within a fluid-carrying conduit. The valve is provided with a second magnet which substantially neutralizes the magnetic field of the magnet M when the valve is in a first state (e.g., indicating substantially no fluid flow), and which does not substantially neutralize the magnet M when the valve is in a second state (e.g., indicating some threshold of fluid flow). When the magnet M is substantially neutralized, the sensor 20 is nonconductive, and the sensor output S3 is at 0 volts. However, when the magnet M is not substantially neutralized, the Hall effect transistor will be conductive due to the biasing effect of the magnet M. Thus, in the initial state, the magnet M, which would ordinarily maintain the sensor 20 in a conductive state, is substantially neutralized by a second magnet located on the (closed) conduit valve; accordingly, when there is no fluid flow, the valve is closed, the magnet M is neutralized, and the sensor 20 is in a non-conductive state.

In an operational state, sensor 10 is rendered conductive due to fluid flow in the conduit. When conductive, the sensor 10 effectively connects the terminals S2 and S3. In this state, sensor output terminal S3 provides a negative voltage output to connection in 2 of the opto-triac 32, and thereby a current is provided to connection pin 1 of the opto-triac 32, through the light-emitting diode (LED) 32a within the opto-triac 32, and through current-limiting resistor 36. The current through LED 32a causes the LED to emit light and render optical triac 32b conductive. When optical triac 32b is rendered conductive, the A.C. voltage at node 16 is rectified by rectifying diode 38 and applied to time delay circuit 14. Time delay circuit 14 operates as described in the related application discussed above; that is, the time delay circuit provides a delay between the sensing of the fluid flow and the connection of the node 16 to the neutral line 12 to power the load L. It will be appreciated that the circuit of FIG. 2 has a minimal current draw and therefore provides a simple, reliable, and efficient means for sensing fluid flow.

In the embodiment described above, the sensor 20 can be embodied by a OHN3040U Hall effect transistor available from OPTEK Technology, Inc. of Carrolton, Tex. Opto-Triac 24 can be a 3047 Opto-Triac available from numerous suppliers. Resistances 22, 28, and 36 can be implemented by 2.2 kΩ, 3 kΩ, and 82 Ω resistors, respectively. Diodes 24 and 38 can implemented be 1N4005 diodes, and zener diode 26 can be a 24 volt zener diode. Storage capacitor 30 can be implemented by a 10 microfarad capacitor rated for 160 volts D.C. It will be appreciated that other suitable components and values can be used.

In one implementation, the sensor 20 can be embodied by a Hall effect sensor with a permanent magnet M attached (e.g., cemented) thereto. The particular Hall effect sensor discussed above is approximately 3/16"×3/16"×1/16", and the magnet M can have a 1/4" diameter and a thickness of 1/8". This relatively small assembly can be inserted into a threaded tube (made of, e.g., brass), and the tube can be covered with epoxy or some other suitable material to provide a substantially watertight seal for the contents of the tube. The threaded tube can then be rotated into the fluid-carrying conduit through a threaded orifice in the conduit such that the end of the tube with the sensor and magnet are located in close (e.g., within approximately 1/8") proximity to the valve magnet when in the closed position, and that the leads of the Hall effect sensor are connected to the remainder of the sensor circuit 10 through the other end of the threaded tube. This exemplary arrangement of an inserted sensor is shown in FIG. 3, which shows a (not to scale) cross-sectional view of a sensor inserted into a pipe defined by pipe wall 40, and having a check valve with a hinged clapper 42. The pipe 40 contains a fluid flowing in the direction indicated by the flow arrow. A threaded tube 44 is inserted into a similarly-threaded hole in pipe wall 40 and this connection is sealed by a suitable seal 46. The tube 44 includes a sensor/magnet assembly S/M, and is encased in a suitable substantially water-tight material. Hinged clapper 42 is provided with sealing portions 48a which cooperate with corresponding portions 48b of the pipe 40 when the clapper is in a closed position. Sensor terminals S1, S2 and S3 (not shown) connect from the sensor/magnet assembly S/M to the remainder of sensor circuit 10. When there is substantially no fluid flow in the pipe, hinged clapper valve 42 is in a closed position, and its associated magnet M2 is positioned sufficiently close (e.g., within approximately 1/8" according to one embodiment) to the sensor/magnet assembly S/M to substantially neutralize the magnet of assembly S/M. When there is fluid flow within the pipe, the flapper valve 42 is moved in the direction of the flow arrow, and magnet M2 is moved away from the sensor/magnet assembly S/M, thereby freeing the magnet of assembly S/M to bias the sensor such that the sensor conducts to enable the operation of the sensor circuit 10 as described above with respect to FIG. 2.

It should be appreciated that the sensor circuit 10 of FIG. 1 can alternatively be embodied by a reed switch associated with a magnet such that motion of the valve or other indication of fluid flow causes the reed switch to close, thereby supplying an input to the time delay circuit 14. The reed switch in this embodiment can be biased in an "on" (conductive) state by its associated magnet, and the reed switch magnet is substantially neutralized by the valve magnet when the valve is in a closed (no fluid flow) state. This alternative has the advantage of lower cost and a significantly reduced number of parts; however, the reed switch involves moving parts and therefore may not be as reliable as the solid-state embodiment described above which uses a Hall effect transistor. Further, it should be appreciated that the reed switch embodiment will be position-sensitive; that is, when the reed switch and attached magnet are inserted by rotating the threaded watertight tube into the threaded conduit orifice, the position and orientation of the reed switch magnet relative to the valve magnet will change and could affect the operability of the sensor. For example, the watertight tube could be rotated such that the distance between the reed switch magnet and the valve magnet in the closed state will be too great for the valve magnet to substantially neutralize the reed switch magnet.

It should also be appreciated that the sensor circuit of the present invention can be implemented using a push-button or pressure switch, such as in commonly used to provide interior lighting control for example, a refrigerator or automobile door. In such an embodiment, the closed clapper of the valve exerts pressure on the pressure-sensitive switch and the circuit such as theat shown in FIG. 2 would indicate a closed condition (that is, would provide no output to the delay circuit). When the valve is opened, indicating fluid flow through the pipe, the pressure exerted by the clapper on the pressure switch is reduced or eliminated, and the circuit of FIG. 2 would indicate an open condition (that is, would provide an indicator signal to the delay circuits).

It should also be appreciated that alternative conventions can be used (i.e., the relationship between the output state of the sensor circuit 10 and the flow/no flow status of the fluid in the conduit).

The foregoing description, while including many specificities, is intended to be illustrative of the general nature of the invention and not limiting. It will be appreciated that those skilled in the art can, by applying current knowledge, readily modify and/or adapt the specific embodiments described above for various applications without departing from the spirit and scope of the invention, as defined by the appended claims and their legal equivalents.

What is claimed is:

1. An apparatus for sensing fluid flow in a conduit, comprising:

a valve which prevents passage of fluid in a closed state, and which allows passage of fluid in an open state;

a first magnet attached to the valve; and a sensor circuit and Hall effect sensor associated with the valve, such that the sensor circuit senses the open or closed state of the valve based on a relative position of the first magnet, wherein the Hall effect sensor is biased in an on state by a second magnet, wherein the first magnet substantially neutralizes the second magnet when the valve is in a closed state, and the first magnet does not substantially neutralize the second magnet when the valve is in an open state.

2. An apparatus for sensing fluid flow, comprising:

a valve having an inlet and an outlet and defining a valve chamber with a valve member arranged for movement entirely within the valve chamber, said valve member preventing passage of fluid through the valve chamber from the inlet to the outlet when the valve member is in a closed position and said valve member allowing passage of fluid through the valve chamber from the inlet to the outlet when the valve member is in an open position;

a first magnet provided within the valve chamber and attached to the valve member for movement with the valve member; and a sensor circuit associated with the valve, said sensor circuit including a sensor extending into the valve chamber with the sensor circuit sensing whether the valve member is in the closed position based on a relative position of the first magnet to the sensor, said sensor circuit indicating an absence of flow through the valve from the inlet to the outlet when the valve member is in the closed position with the first magnet adjacent to the sensor.

3. The apparatus of claim 2, wherein the sensor comprises a Hall effect sensor.

4. The apparatus of claim 3, wherein the Hall effect sensor is biased in an on state by a second magnet, wherein the first magnet substantially neutralizes the second magnet when the valve member is in the closed position, and the first magnet does not substantially neutralize the second magnet when the valve member is not in the closed position.

5. The apparatus of claim 2, wherein the valve member is rigid and arranged for pivotal movement within the valve chamber.

6. The apparatus of claim 2, wherein the sensor comprises a reed switch.

7. The apparatus of claim 6, wherein the reed switch is biased in a closed state by a second magnet, wherein the first magnet substantially neutralizes the second magnet when the valve member is in the closed position, and the first magnet does not substantially neutralize the second magnet when the valve member is not in the closed position.

8. The apparatus of claim 2, wherein the sensor is housed in a casing which extends into the valve chamber.

9. The apparatus of claim 8, wherein the casing is provided with threads to cooperate with a threaded hole in a wall of the valve.

10. The apparatus of claim 4, wherein the Hall effect sensor, in the on state, provides a current to a means for supplying a voltage to a load.

11. The apparatus of claim 10, wherein the means for supplying a voltage includes a time delay circuit for delaying the supplying the voltage to the load, and wherein the load is an alarm.

12. A circuit for sensing the position of a magnet associated with a valve member in a fluid-carrying conduit, comprising:

sensor means for sensing a relative position of the magnet associated with the valve member and having a first output state when the magnet is in a first position and a second output state when the magnet is in a second position, the sensor causing an indication current to flow in the first output state; and means for applying an operating voltage to a load in response to the indication current, said means for applying an operating voltage including an opto-triac for receiving the indication current and providing a connection current to a means for connecting a terminal of the load to a neutral line in response to receiving the indication current.

13. The circuit of claim 12, wherein the means for connecting includes a time delay circuit for delaying the connection of the terminal of the load to the neutral line.

14. The circuit of claim 12, further comprising voltage-regulating circuitry for regulating the voltage applied to the sensor means.

15. The circuit of claim 14, wherein the voltage-regulating circuitry includes a zener diode and at least one current-limiting resistor.

16. The circuit of claim 12, wherein the sensor means includes a second magnet for biasing the sensor means in the first output state, and the first magnet substantially neutralizes the second magnet when the magnet is in the second position.

17. The circuit of claim 12, wherein the sensor means comprises a Hall effect sensor.

18. The circuit of claim 12, wherein the sensor means comprises a reed switch.

19. An apparatus for sensing fluid flow in a conduit, comprising:

a flapper valve member which prevents passage of fluid in a closed state, and which allows passage of fluid in an open state;

a first magnet attached to the flapper valve member; and, a sensor circuit associated with the flapper valve member, said sensor circuit having a sensor such that the sensor circuit senses the open or closed state of the flapper valve member based on a relative position of the first magnet with respect to the sensor, said sensor circuit including a second magnet which is provided adjacent the sensor, said first magnet substantially neutralizing the second magnet when the flapper valve member is in the closed state, and said first magnet not substantially neutralizing the second magnet when the valve member is in an open state.

20. The apparatus of claim 19, wherein the sensor comprises a Hall effect sensor.

21. The apparatus of claim 20, wherein the Hall effect sensor is biased in an on state by the second magnet.

22. The apparatus of claim 19, wherein the sensor comprises a reed switch.

* * * * *